United States Patent [19]

Schmidt et al.

[11] 3,748,704
[45] July 31, 1973

[54] CLAMP FOR BIAXIAL STRETCHING MACHINES

[75] Inventors: Willi Schmidt, Elsenroth; Rainer Berzbach, Homburg-Brol; Klaus Berger, Runderoth, all of Germany

[73] Assignee: Erwin Kampf Maschinenfabrik, Wiehl, Germany

[22] Filed: Jan. 4, 1972

[21] Appl. No.: 215,297

[52] U.S. Cl. .................................................. 26/62 B
[51] Int. Cl. ............................................... D06c 3/10
[58] Field of Search .................. 26/61 B, 62 B, 62 C

[56] References Cited
UNITED STATES PATENTS
| | | | |
|---|---|---|---|
| 1,478,454 | 12/1923 | Renold | 26/61 B |
| 3,221,416 | 12/1965 | Smith, Jr. | 26/61 B UX |
| 3,247,544 | 4/1966 | Bromley | 26/61 B UX |
| 3,580,451 | 5/1971 | Fraitzi | 26/62 B UX |
| 3,638,289 | 2/1972 | Dornier et al. | 26/62 B X |

FOREIGN PATENTS OR APPLICATIONS
| | | | |
|---|---|---|---|
| 1,067,872 | 5/1967 | Great Britain | 26/61 B |
| 1,136,709 | 12/1968 | Great Britain | 26/61 B |

*Primary Examiner*—Robert R. Mackey
*Attorney*—Bacon & Thomas

[57] ABSTRACT

A clamp having means for clamping a film to be biaxially stretched has means, generally vertically aligned with the clamping means, for engagement by a driving member to thereby minimize twisting torques about a vertical axis. The clamp further has opposed and longitudinally spaced rollers engaging a guide rail to resist any tendency for the clamp to twist on the guide rail.

3 Claims, 4 Drawing Figures

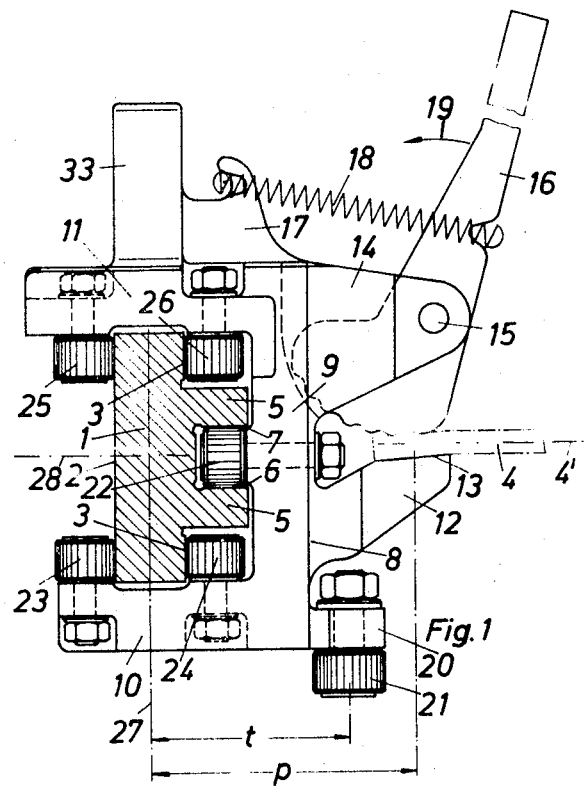
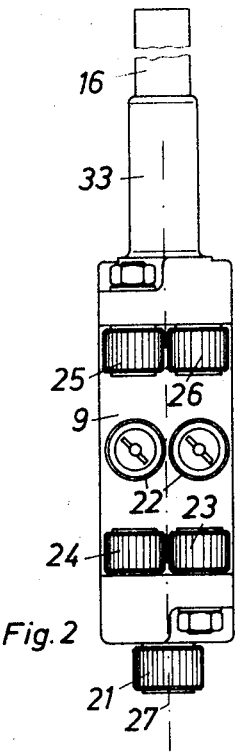
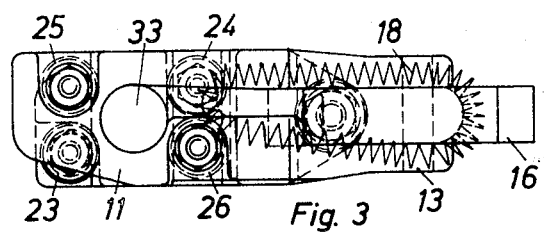
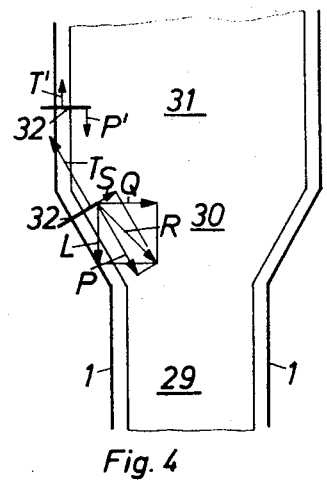

CLAMP FOR BIAXIAL STRETCHING MACHINES

The present invention relates to a clamp which is suitable for engagement with a one-piece guide rail of biaxial stretching apparatus. Such apparatus is commonly used for biaxially stretching webs or films of plastic materials, in order to impart to them a desired molecular orientation.

In the most common form of such apparatus, the web or film is stretched longitudinally by feeding it over rolls and by causing the take-up roll to rotate at a faster speed than the feed roll. Stretching in the transverse direction is effected by gripping each edge of the web or film with a plurality of clamps and causing the clamps to move, with the film, along a pair of diverging guide rails. The present invention provides an improved form of clamp for use in such apparatus.

U.S. Pat. No. 3,391,421 describes a clamp having a film-holding portion and a track portion; said film-holding portion comprising a film contact surface and a pivotally mounted gripper lever biased by resilient means into engagement with said film contact surface; and said track portion comprising slot means and rolling means such that the rolling means only contact the guide rail. The rolling means comprises a plurality of rollers rotatably mounted in said clamp, the rollers being so arranged that they engage both sides and the top and bottom of the rail when the rail passes through the slot means.

This clamp is not driven in the stretching zone of the apparatus but is merely carried along by the film. However, it has been shown, for example in U.K. Patent Specification No. 1,128,081, that it is necessary to synchronize movement of the clamp and the film within the stretching zone. In order to do this, of course, each clamp must be provided with some drive means. If such drive means were to be fitted to the clamp described in U.S. Pat. Specification No. 3,391,421, then, clearly the drive means must be located beneath the guide rail. However, this results in moments on the clamp due to the reaction of the film. Such moments, as is well known, tend to cause tearing or uneven stretching of the film.

The present invention consists in a clamp for engagement with a one-piece guide rail of biaxial stretching apparatus, said clamp comprising: a U-shaped body portion comprising two arms joined by a bridging member; a clamping surface attached to said bridging member and means for clamping a film onto said surface; a drive roller located so as, in operation, to be substantially vertically below said surface; at least one guide roller attached to said body portion, and preferably to said bridging member, so as, in operation, to engage with at least one guide face of said rail, said face running parallel with said film; and rollers mounted on said arms so as, in operation, to engage with two surfaces of said rail perpendicular to said film, at least one roller on each arm engaging with each said surface and each roller on one arm being displaced along the direction of travel of said clamp relative to the roller on the other arm engaging the same surface.

For the purposes of this specification, surfaces of a rail are regarded as a single surface if they are parallel and face in the same direction; thus, a surface may be regarded as a single surface notwithstanding that it may comprise two separated surfaces.

We prefer that there should be two guide rollers engaging, in operation, with the parallel guide face of the rail and we also prefer that there should be two such parallel faces and that the guide roller or guide rollers should be able to engage with both such faces.

We prefer that each roller on one arm is displaced along the direction of travel of said clamp relative to the other roller on the same arm, i.e. the rollers are at the apices of a tetrahedron.

It is necessary that the component of force acting perpendicular to the direction of travel of the clamp be accommodated, within the stretching zone, by the guide rail for the clamp. This is achieved by one of the vertical surfaces of the guide rail and thus proper accommodation of the principal force is ensured. The force acting in the direction of travel of the clamp is applied by means of the drive roller. The clamping surface is preferably situated substantially centrally between the two arms of the U-shaped body portion and, accordingly, since the clamping surface is thus situated in the resultant central plane of the roller path circles defined by the rollers engaging the vertical surfaces of the guide rail, there is no resultant torque or moment from the transverse forces on the sheet referred to the clamp guide rail. Accordingly, the drive roller, as a result of friction, leaves only a small moment about the longitudinal axis and this can readily be transmitted onto the vertical surfaces of the guide rail by the two pairs of rollers. The drive roller imparts substantially only one moment about the transverse axis of the clamp and this is transmitted to the faces of the guide rail extending parallel to the plane of the film. Since, in the preferred embodiment, two guide rollers are substantially exclusively used for transmitting this moment, this moment is unlikely to cause any difficulties.

The most important moments within the stretching zone are produced about the vertical axis of the clamp due to the presence of longitudinal forces. As the drive roller is disposed substantially vertically below the clamping surface, the longitudinal component of the driving force and the longitudinal component of the reaction force, each referred to the vertical axis of the clamp, are substantially equal and there is, consequently, only a minor resultant moment remaining about the vertical axis. Hence, the rollers are relieved of substantially all moments along the vertical guide surfaces.

The invention is further illustrated with reference to the accompanying drawings, in which:

FIG. 1 shows a clamp according to the invention with, in section, an associated guide rail, viewed in the direction of movement of the clamp;

FIG. 2 is a side elevational view of the clamp shown in FIG. 1;

FIG. 3 is a plan view of the clamp shown in FIG. 1, seen in the direction of the vertical axis of the clamp; and FIG. 4 is a schematic diagram of the stretching zone showing the forces and moments acting on the clamps.

FIG. 1 shows a guide rail 1 having two guide surfaces 2 and 3 parallel to each other and extending normally to the plane 4' of the film to be stretched. The plane 4' is the central plane of film 4. The surfaces 2 and 3 are hereinafter referred to as the "vertical surfaces." The surface 3 is interrupted by two projections 5, which define a further two opposed guide surfaces 6 and 7, which extend parallel to plane 4' and which are substantially equidistant from plane 4'.

Each clamp comprises a body portion 8 consisting of a bridging member 9, to which are attached two arms 10 and 11. The arms extend generally parallel to the plane 4'. Attached to the bridging member 9 is an arm member 12 which provides a clamping surface 13. Also attached to the bridging member 9 are two lugs 14, between which a clamping lever 16 is pivotally mounted on pivot 15. A tension spring 18 is placed around lever 16 and its ends are attached to a hook-shaped lug 17 so as to bias the clamping lever 16 in the direction of arrow 19; as a result of this, the sheet 4 is clamped between the lower portion of lever 16 and the clamping surface 13.

The bridging member 9 further carries a bearing lug 20, which accommodates drive roller 21. Clamping lever 16 and drive roller 21 are disposed along the central transverse plane of the clamp, as may be more clearly seen in FIG. 2.

Two rollers 22 are mounted on bridging member 9, with their axes substantially level with plane 4'. These rollers 22 are in engagement with surfaces 6 and 7, the distance between surfaces 6 and 7 being slightly greater than the diameter of rollers 22 so that the rollers are capable of moving along either surface 6 or surface 7, depending upon the forces and moments at any given time. Each arm 10 and 11 carries two rollers 23, 24 and 25, 26. Rollers 25 and 26 are displaced relative to each other along the longitudinal axis of the clamp. Rollers 23 and 24 are similarly displaced in the longitudinal direction of the clamp, but in the opposite sense to rollers 25 and 26. The transverse component of the distance between rollers 25 and 26 and between rollers 23 and 24 is equal to the distance between surfaces 2 and 3. Rollers 23 and 25 engage with vertical surface 2 of guide rail 1 and substantially take up the retaining forces active transversely of the guide rail. In addition, rollers 23, 24, 25 and 26 serve to accommodate the moments acting about vertical axis 27 of the clamp, i.e. rollers 25 and 26 take up the moments in the clockwise direction and rollers 23 and 24 take up the moments in the anti-clockwise direction. It is due to this arrangement that the moments acting about the vertical axis causes one of the pairs of rollers 23, 24, or 25, 26 to engage with the guide surfaces. This alternating reception of moments acting in different senses prevents the clamp from jumping. The paths of circular movement of rollers 25 and 26 as well as rollers 23 and 24 each define one plane. The resultant central plane 28 is shown in FIG. 1.

FIG. 4 shows a schematic representation of the arrangement of a biaxial stretching machine. A feed zone 29, intended for pre-heating the plastics film, is followed by a stretching zone 30, which, in turn, is followed by a setting zone 31, in which the sheet is allowed to cool down and solidify. At each edge of the sheet is a guide rail 1, the guide rails being substantially parallel within the feed zone 29 and the setting zone 31 and diverging within the stretching zone 30. The edges of the sheet are gripped by a plurality of clamps, which, in turn, are mounted on guide rails 1. Some of the clamps are shown schematically by numeral 32.

Within the stretching zone 30, a transverse force Q and a longitudinal force L act on the sheet to give a resultant force R. These forces are shown schematically, rather than to scale, in FIG. 4. The resultant force R can be broken down to a component P parallel to the guide rail and a component S perpendicular to said guide rail. Component S represents the retaining force which is substantially taken up by rollers 23 and 25, while component P is balanced by the conveying force T which, as seen in FIG. 1, acts upon drive roller 21 and has a component $t$ referred to vertical axis 27. The component P is transmitted to face 13 and has a component p referred to vertical axis 27. Due to the principle of alternating action mentioned above, the resultant force is caused to disappear. The resultant moment about vertical axis 27 is of the order of $$\overline{M} = T.t + P.p = T(t-p).$$

Since forces $t$ and $p$ are only slightly different, the resultant moment is of very small magnitude. This is due to the fact that the drive roller 21 is disposed substantially vertically below clamping surface 13. Depending upon the sense in which it acts, the resultant moment is taken up either by rollers 25 and 26 or by rollers 23 and 24. When in the stretching zone, where the forces are highest, virtually complete equalization of moments about the vertical axis is obtained.

Only minor forces are active in setting zone 31, and, consequently the moments experienced in this zone are also low. It is for this reason that another drive member 33, which is substantially aligned along the vertical axis 27 can be used to drive the clamp, e.g. by being seized by a conveying chain. The forces p' in the longitudinal direction are also shown in FIG. 4; however, in this case the resultant moment about the vertical axis is so small that the loading due to this moment is readily acceptable.

We claim:

1. A clamp for engagement with a one-piece guide rail of biaxial stretching apparatus, said clamp comprising: a U-shaped body portion comprising two arms joined by a bridging member; a clamping surface attached to said bridging member and means for clamping a film onto said surface; a drive roller located so as, in operation, to be substantially vertically below said surface; at least one guide roller attached to said body portion so as, in operation, to engage with at least one guide face of said rail, said face running parallel with said film; and rollers mounted on said arms so as, in operation, to engage with two surfaces of said rail perpendicular to said film, at least one roller on each arm engaging with each said surface and each roller on one arm being displaced along the direction of travel of said clamp relative to the roller on the other arm engaging the same surface.

2. A clamp according to claim 1, in which each roller on one arm is displaced along the direction of travel of said clamp relative to the other roller on the same arm.

3. A clamp according to claim 1, comprising two of said guide rollers attached so as, in operation, to engage with the parallel guide face of said rail, the axes of said rollers lying in a plane parallel to the plane of said film.

* * * * *